(12) United States Patent
Tang

(10) Patent No.: US 11,076,384 B2
(45) Date of Patent: Jul. 27, 2021

(54) SIGNAL TRANSMISSION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/095,322

(22) PCT Filed: May 12, 2016

(86) PCT No.: PCT/CN2016/081880
§ 371 (c)(1),
(2) Date: Oct. 19, 2018

(87) PCT Pub. No.: WO2017/193339
PCT Pub. Date: Nov. 16, 2017

(65) Prior Publication Data
US 2019/0141674 A1 May 9, 2019

(51) Int. Cl.
*H04W 72/00* (2009.01)
*H04L 5/00* (2006.01)
(Continued)

(52) U.S. Cl.
CPC .......... *H04W 72/005* (2013.01); *H04L 5/001* (2013.01); *H04L 5/0005* (2013.01); *H04L 5/005* (2013.01);
(Continued)

(58) Field of Classification Search
CPC ............. H04W 72/005; H04W 72/042; H04W 56/001; H04W 72/12; H04B 7/024;
(Continued)

(56) References Cited

U.S. PATENT DOCUMENTS 9,288,786 B2 * 3/2016 Morioka ............... H04L 1/1861
9,456,372 B2 * 9/2016 Lee ...................... H04B 7/0626
(Continued)

FOREIGN PATENT DOCUMENTS

CN 102474829 A 5/2012
CN 103402251 A 11/2013
(Continued)

OTHER PUBLICATIONS

First Office Action of the Chinese application No. 201680084355.0, dated Aug. 20, 2019.
(Continued)

*Primary Examiner* — Brian T O Connor
(74) *Attorney, Agent, or Firm* — Ladas & Parry, LLP

(57) ABSTRACT

Disclosed in the present invention are a signal transmission method, a network device, and a terminal device. The method comprises: determining a time-frequency resource position of a downlink signal, the downlink signal comprising at least one of a synchronization signal, a broadcast signal, a common control channel signal, a common reference signal and a measurement reference signal, the time-frequency resource position of the downlink signal being on multiple frequency channel numbers of a carrier in a preset time, and the multiple frequency channel numbers being part of frequency channel numbers in a bandwidth of the carrier; and sending the downlink signal according to the time-frequency resource position of the downlink signal. The signal transmission method, the network device and the terminal device in embodiments of the present invention can
(Continued)

improve the communication efficiency of the terminal device.

19 Claims, 6 Drawing Sheets

(51) Int. Cl.
| | |
|---|---|
| *H04L 27/26* | (2006.01) |
| *H04W 56/00* | (2009.01) |
| *H04B 7/06* | (2006.01) |
| *H04B 7/0452* | (2017.01) |
| *H04J 11/00* | (2006.01) |
| *H04B 7/024* | (2017.01) |
| *H04W 72/12* | (2009.01) |

(52) U.S. Cl.
CPC .......... *H04L 5/0053* (2013.01); *H04L 27/26* (2013.01); *H04L 27/2602* (2013.01); *H04W 56/001* (2013.01); *H04B 7/024* (2013.01); *H04B 7/0452* (2013.01); *H04B 7/0602* (2013.01); *H04J 11/00* (2013.01); *H04L 5/0023* (2013.01); *H04W 72/12* (2013.01)

(58) Field of Classification Search
CPC ..... H04B 7/0452; H04B 7/0602; H04J 11/00; H04L 27/2655; H04L 5/0091; H04L 5/0007; H04L 27/2602; H04L 5/0053; H04L 5/001; H04L 27/26; H04L 5/0005; H04L 5/005; H04L 5/0023
See application file for complete search history.

(56) References Cited

U.S. PATENT DOCUMENTS

| | | | |
|---|---|---|---|
| 9,769,810 B2* | 9/2017 | Imamura | H04J 11/00 |
| 9,894,602 B1 | 2/2018 | Manchanda et al. | |
| 10,313,960 B2* | 6/2019 | Yi | H04L 5/00 |
| 10,390,198 B2* | 8/2019 | Moulsley | H04L 5/0053 |
| 10,524,142 B2 | 12/2019 | Kusashima et al. | |
| 10,849,102 B2* | 11/2020 | Tang | H04L 5/001 |
| 2011/0190024 A1 | 8/2011 | Seong | |
| 2012/0093101 A1 | 4/2012 | Dai | |
| 2012/0250641 A1 | 10/2012 | Sartori | |
| 2012/0322483 A1 | 12/2012 | Ji | |
| 2013/0294547 A1 | 11/2013 | Lane | |
| 2014/0003379 A1 | 1/2014 | Kang | |
| 2014/0023157 A1 | 1/2014 | Shimezawa | |
| 2014/0024119 A1 | 1/2014 | Cho | |
| 2014/0092827 A1 | 4/2014 | Jongren et al. | |
| 2014/0241191 A1 | 8/2014 | Yu et al. | |
| 2014/0341175 A1* | 11/2014 | Beale | H04L 5/0007 370/330 |
| 2015/0023263 A1 | 1/2015 | Son et al. | |
| 2015/0092768 A1 | 4/2015 | Ng et al. | |
| 2015/0208389 A1* | 7/2015 | Imamura | H04J 11/00 370/329 |
| 2015/0256403 A1 | 9/2015 | Li et al. | |
| 2017/0290016 A1 | 10/2017 | Yi et al. | |
| 2018/0132137 A1* | 5/2018 | Dai | H04W 28/18 |

FOREIGN PATENT DOCUMENTS

| | | |
|---|---|---|
| CN | 103428143 A | 12/2013 |
| CN | 103685119 A | 3/2014 |
| CN | 103716841 A | 4/2014 |
| CN | 105451341 A | 3/2016 |
| CN | 106937361 A | 7/2017 |
| JP | 2015530811 A | 10/2015 |
| RU | 2487492 C1 | 7/2013 |
| WO | 2009092332 A1 | 7/2009 |
| WO | 2011009277 A1 | 1/2011 |
| WO | 2011017467 A2 | 2/2011 |
| WO | 2011074807 A2 | 6/2011 |
| WO | 2013155978 A1 | 10/2013 |

OTHER PUBLICATIONS

First Office Action of the Russian application No. 2018142982, dated Jun. 14, 2019.
Supplementary European Search Report in the European application No. 16901294.5, dated Mar. 6, 2019.
Supplementary European Search Report in the European application No. 19150345.7, dated Apr. 26, 2019.
English translation of the Written Opinion of the International Search Authority in the international application No. PCT/CN2016/081880, dated Jan. 25, 2017.
English translation of the International Preliminary Report on Patentability Chapter I, PCT/CN2016/081880, dated Nov. 13, 2018.
International Search Report in international application No. PCT/CN2016/081880, dated Jan. 25, 2017.
Written Opinion of the International Search Authority in international application No. PCT/CN2016/081880, dated Jan. 25, 2017
Second Office Action and search report of the Chinese application No. 201680084355.0, dated Nov. 12, 2019.
Non-Final Office Action from U.S. Appl. No. 16/231,841, dated Apr. 19, 2019.
Final Office Action from U.S. Appl. No. 16/231,841, dated Aug. 30, 2019.
Third Office Action of the Chinese application No. 201680084355.0, dated Feb. 21, 2020.
First Office Action of the European application No. 16901294.5, dated Mar. 23, 2020.
First Office Action of the European application No. 19150345.7, dated Apr. 2, 2020.
Non-final Office Action dated Jan. 23, 2020 regarding the U.S. Appl. No. 16/231,841, which is the continuation application of the subject case.
First Office Action of the Brazilian application No. 1120180731773, dated Sep. 8, 2020.
3GPP TS 36.211 V11.0.0 (Sep. 2012); 3rd Generation Partnership Project; Technical Specification Group Radio Access Network; Evolved Universal Terrestrial Radio Access (E-UTRA); Physical Channels and Modulation (Release 11).
Written Opinion of the Singaporean application No. 11201809608X, dated Jan. 13, 2020.
First Office Action of the Canadian application No. 3,022,660, dated Oct. 4, 2019.
First Office Action of the U.S. Appl. No. 16/231,841, dated Apr. 19, 2019.
First Office Action of the U.S. Appl. No. 16/231,841, dated Jan. 23, 2020.
Final Office Action of the U.S. Appl. No. 16/231,841, dated Aug. 30, 2019.
Final Office Action of the U.S. Appl. No. 16/231,841, dated Nov. 15, 2019.
Notice of Rejection of the Chinese application No. 201680084355.0, dated May 25, 2020.
First Office Action of the Japanese application No. 2018-555514, dated May 22, 2020.
Office Action of the Indian application No. 201817045649, dated Jul. 30, 2020.
Notice of Allowance of the U.S. Appl. No. 16/231,841, dated Jul. 17, 2020.
Second Office Action of the Canadian application No. 3022660, dated Oct. 29, 2020.
Decision of Refusal of the Japanese application No. 2018-555514, dated Dec. 22, 2020.
Oral Office Action of the European application No. 16901294.5, dated Dec. 23, 2020.
Oral Office Action of the European application No. 19150345.7, dated Dec. 23, 2020.
"WF on Overview of NR" 3GPP TSG RAN WG1 Meeting #84bis R1-163615 Busan, Korea Apr. 11-15, 2016 Agenda: 8.1.1.

(56) References Cited

OTHER PUBLICATIONS

"WF on Forward Compatibility" 3GPP TSG RAN WG1 #84bis R1-163555 Busan, Korea Apr. 11-15, 2016.
First Office Action of the Australian application No. 2016406274, dated Feb. 26, 2021.
First Office Action of the Taiwanese application No. 106115184, dated Mar. 12, 2021.
Fourth Office Action of the Chinese application No. 201680084355.0, dated Mar. 26, 2021.
Xu Ying, "Research on Downlink Cell Searchal Gorithm of TD-LTE", <China Excellent Master Dissertation Full-text Database (Electronic Journal)>, issued on Mar. 15, 2016.
China Communications Construction Group Design Institute Co. Ltd, LTE Networking and Engineering Practice, "PBCH time-frequency position", issued on Jul. 31, 2021.
Notice of Allowance of the Chinese application No. 201680084355.0, dated May 31, 2021.
Third Office Action of the Canadian application No. 3022660, dated Apr. 26, 2021.

\* cited by examiner

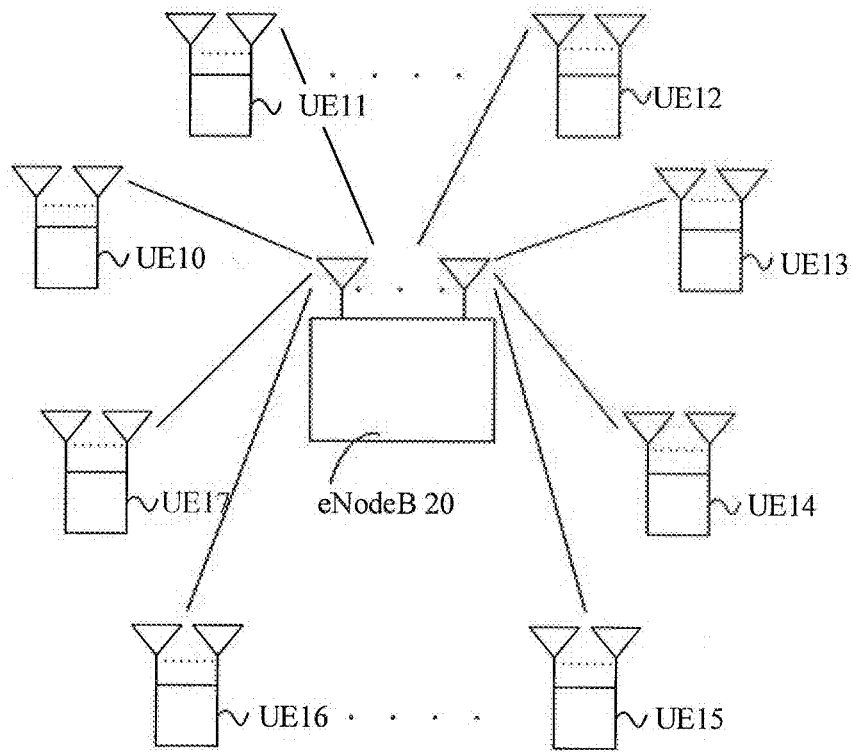

A time-frequency resource location of a downlink signal is determined, the downlink signal including at least one of an SS, a broadcast signal, a common control channel signal, a common reference signal or an MRS, the time-frequency resource position of the downlink signal being on multiple frequency points of a carrier within a predetermined time and the multiple frequency points being part of frequency points within a bandwidth of the carrier  — S210

The downlink signal is transmitted according to the time-frequency resource location of the downlink signal  — S220

FIG. 2

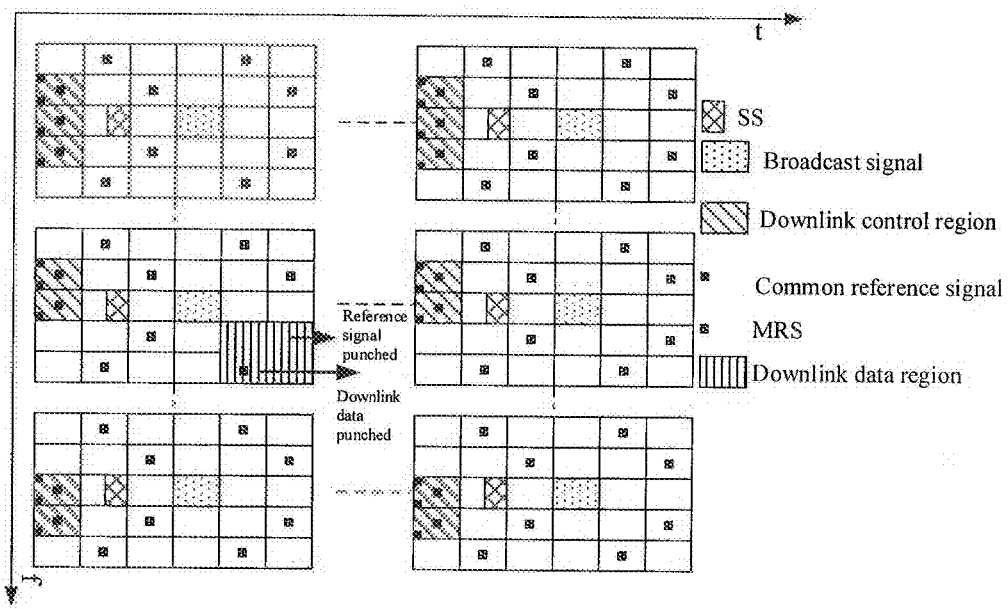

| A time-frequency resource location of a downlink signal is determined, the downlink signal including at least one of an SS, a broadcast signal, a common control channel signal, a common reference signal or an MRS, the time-frequency resource position of the downlink signal being on multiple frequency points of a carrier within a predetermined time and the multiple frequency points being part of frequency points within a bandwidth of the carrier | S810 |

| The downlink signal transmitted by network equipment is received according to the time-frequency resource location of the downlink signal | S820 |

FIG. 8

SIGNAL TRANSMISSION METHOD, NETWORK DEVICE, AND TERMINAL DEVICE

CROSS-REFERENCE TO RELATED APPLICATION

The present application is the U.S. national phase of PCT Application PCT/CN2016/081880 filed on May 12, 2016, entitled "SIGNAL TRANSMISSION METHOD, NETWORK DEVICE, AND TERMINAL DEVICE", the disclosure of which is hereby incorporated by reference in it entirety.

TECHNICAL FIELD

The disclosure relates to communications, and more particularly to a method for transmitting a signal, network equipment and terminal equipment.

BACKGROUND

A carrier width of a 5th-Generation (5G) system has a relatively wide variation range. For example, a maximum width is more than or equal to 80 MHz. At present, a Synchronization Signal (SS) and a broadcast signal in the Long Term Evolution (LTE)/4th-Generation (4G) are only transmitted on a central frequency point of a carrier. For a large-bandwidth carrier 5G system, an undiversified synchronization channel and broadcast channel manner in the LTE/4G is unlikely to meet a rapid search requirement of terminal equipment, thereby influencing communication efficiency of the terminal equipment.

Therefore, how to improve communication efficiency of terminal equipment becomes a technical problem urgent to be solved for a large-bandwidth carrier communication system.

SUMMARY

Embodiments of the disclosure provide a method for transmitting a signal, network equipment and terminal equipment, able to improving communication efficiency of the terminal equipment.

A first aspect provides a method for transmitting a signal. A time-frequency resource location of a downlink signal is determined. The downlink signal may include at least one of an SS, a broadcast signal, a common control channel signal, a common reference signal or a Measurement Reference Signal (MRS). The time-frequency resource location of the downlink signal may be on multiple frequency points of a carrier within a predetermined time and the multiple frequency points may be part of frequency points within a bandwidth of the carrier. The downlink signal is transmitted according to the time-frequency resource location of the downlink signal.

According to the method for transmitting a signal in the embodiments of the disclosure, the downlink signal is transmitted on the multiple frequency points of the carrier within the predetermined time, so that a rapid search requirement of terminal equipment may be met, and communication efficiency of the terminal equipment may be improved.

Transmission on the multiple frequency points of the carrier within the predetermined time may not only refer to repeated transmission on the multiple frequency points within a period of time according to periodicity but also refer to transmission on a frequency point in periodicity within a period of time and transmission on another frequency point in a next periodicity.

In some possible implementation modes, the downlink signal may include the SS. The operation that the downlink signal is transmitted according to the time-frequency resource location of the downlink signal may include that the SS is transmitted on the multiple frequency points according to periodicity.

In some possible implementation modes, periodicities for transmitting the SS on different frequency points in the multiple frequency points may be the same as each other or different from each other.

In some possible implementation modes, sequences used by transmitting the SS on different frequency points in the multiple frequency points may be the same as each other or different from each other.

In some possible implementation modes, the downlink signal may include the broadcast signal. The operation that the downlink signal is transmitted according to the time-frequency resource location of the downlink signal may include that the broadcast signal is transmitted on the multiple frequency points according to the periodicity.

In an example, the broadcast signal and the SS may form a correspondence.

In some possible implementation modes, the downlink signal may include the common control channel signal or the common reference signal. A time-frequency resource location of the common control channel signal or the common reference signal may be within a downlink control region. The downlink control region may be located on the multiple frequency points in a radio frame, and a time-domain length of the downlink control region in the radio frame may be smaller than a length of the radio frame.

In some possible implementation modes, the method may further include that: information of the downlink control region is explicitly or implicitly indicated to terminal equipment.

In some possible implementation modes, the operation that the information of the downlink control region is explicitly or implicitly indicated to the terminal equipment may include that the information of the downlink control region is explicitly or implicitly indicated to the terminal equipment through at least one of starting and ending location information of each of the multiple frequency points; information of the radio frame and a subframe in the radio frame where the downlink control region is located; information of a sequence for the SS, the information of the sequence for the SS being configured to indicate whether the downlink control region is located on the frequency points where the SS is transmitted or not; relative time-frequency location information of the SS and the broadcast signal, the relative time-frequency location information being configured to indicate whether the downlink control region is located on the frequency points where the SS and the broadcast signal are transmitted or not; a content of the broadcast signal; or a content of basic system information indicated by the broadcast signal.

In some possible implementation modes, the downlink signal may include the MRS. The operation that the downlink signal is transmitted according to the time-frequency resource location of the downlink signal may include that the MRS is transmitted in a location, not used for downlink control region, of the multiple frequency points, according to the periodicity.

In some possible implementation modes, the method may further include that: if a time-frequency resource location of the MRS conflicts with a time-frequency resource location of downlink data, the MRS or the downlink data is transmitted in a punched manner.

According to the method for transmitting a signal in the embodiments of the disclosure, a speed and accuracy of cell search and measurement in an IDLE or CONNECTED state by the terminal equipment may be improved, thereby improving the communication efficiency of the terminal equipment.

A second aspect provides a method for transmitting a signal. A time-frequency resource location of a downlink signal is determined. The downlink signal may include at least one of an SS, a broadcast signal, a common control channel signal, a common reference signal or a Measurement Reference Signal (MRS). The time frequency resource location of the downlink signal may be on multiple frequency points of a carrier within a predetermined time and the multiple frequency points may be part of frequency points within a bandwidth of the carrier. The downlink signal transmitted by network equipment is received according to the time-frequency resource location of the downlink signal.

According to the method for transmitting a signal in the embodiments of the disclosure, the downlink signal is received on the multiple frequency points of the carrier within the predetermined time, so that a rapid search requirement of terminal equipment may be met, and communication efficiency of the terminal equipment may be improved.

In some possible implementation modes, the downlink signal may include the SS. The operation that the downlink signal transmitted by the network equipment is received according to the time-frequency resource location of the downlink signal may include that the SS transmitted by the network equipment according to periodicity is received on the multiple frequency points.

In some possible implementation modes, periodicities for transmitting the SS on different frequency points in the multiple frequency points may be the same as each other or different from each other.

In some possible implementation modes, sequences used by transmitting the SS on different frequency points in the multiple frequency points may be the same as each other or different from each other.

In some possible implementation modes, the downlink signal may include the broadcast signal. The operation that the downlink signal transmitted by the network equipment is received according to the time-frequency resource location of the downlink signal may include that the broadcast signal transmitted by the network equipment according to the periodicity is received on the multiple frequency points.

In some possible implementation modes, the downlink signal may include the common control channel signal or the common reference signal. A time-frequency resource location of the common control channel signal or the common reference signal may be within a downlink control region. The downlink control region may be located on the multiple frequency points in a radio frame, and a time-domain length of the downlink control region in the radio frame may be smaller than a length of the radio frame.

In some possible implementation modes, the method may further include than information, explicitly or implicitly indicated by the network equipment, of the downlink control region is acquired.

The operation that the time-frequency resource location of the downlink signal is determined may include that the downlink control region is determined according to the information of the downlink control region.

In some possible implementation modes, the operation that the downlink control region is determined according to the information of the downlink control region may include that the downlink control region is determined according to at least one of: starting and ending location information of each of the multiple frequency points; information of the radio frame and a subframe in the radio frame where the downlink control region is located; information of a sequence for the SS, the information of the sequence for the SS being configured to indicate whether the downlink control region is located on the frequency points where the SS is transmitted or not; relative time-frequency location information between the SS and the broadcast signal, the relative time-frequency location information being configured to indicate whether the downlink control region is located on the frequency points where the SS and the broadcast signal are transmitted or not; a content of the broadcast signal; or a content of basic system information indicated by the broadcast signal.

In some possible implementation modes, the downlink signal may include the MRS. The operation that the downlink signal transmitted by the network equipment is received according to the time-frequency resource location of the downlink signal may include that the MRS transmitted by the network equipment according to the periodicity is received in a location, not used for downlink control region, of the multiple frequency points.

According to the method for transmitting a signal of the embodiments of the disclosure, a speed and accuracy of cell search and measurement in an IDLE or CONNECTED state by the terminal equipment may be improved, thereby improving the communication efficiency of the terminal equipment.

A third aspect provides network equipment, which includes modules configured to execute the method in the first aspect or any possible implementation mode of the first aspect.

A fourth aspect provides terminal equipment, which includes modules configured to execute the method in the second aspect or any possible implementation mode of the second aspect.

A fifth aspect provides network equipment. The network equipment includes a processor, a memory and a communication interface. The processor is connected with the memory and the communication interface. The memory is configured to store at least one instruction. The processor is configured to execute the at least one instruction, and the communication interface is configured for communication with another network element under control of the processor. When the processor executes the at least one instruction stored in the memory, such execution enables the processor to execute the method in the first aspect or any possible implementation mode of the first aspect.

A sixth aspect provides terminal equipment. The terminal equipment includes a processor, a memory and a communication interface. The processor is connected with the memory and the communication interface. The memory is configured to store at least one instruction. The processor is configured to execute the at least one instruction, and the communication interface is configured for communication with another network element under control of the processor. When the processor executes the at least one instruction stored in the memory, such execution enables the processor to execute the method in the second aspect or any possible implementation mode of the second aspect.

A seventh aspect provides a computer-readable medium, which is configured to store a computer program, the computer program including at least one instruction configured to execute the method in the first aspect or any possible implementation mode of the first aspect.

An eighth aspect provides a computer-readable medium, which is configured to store a computer program, the computer program including at least one instruction configured to execute the method in the second aspect or any possible implementation mode of the second aspect.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skilled in the art according to these drawings without creative work.

FIG. 1 is a schematic diagram of an application scenario according to an embodiment of the disclosure.

FIG. 2 is a schematic flowchart of a method for transmitting a signal according to an embodiment of the disclosure.

FIG. 7 is a schematic diagram of a time-frequency resource location of a downlink signal according to yet another embodiment of the disclosure.

FIG. 8 is a schematic flowchart of a method for transmitting a signal according to another embodiment of the disclosure.

DETAILED DESCRIPTION

Figure 3:
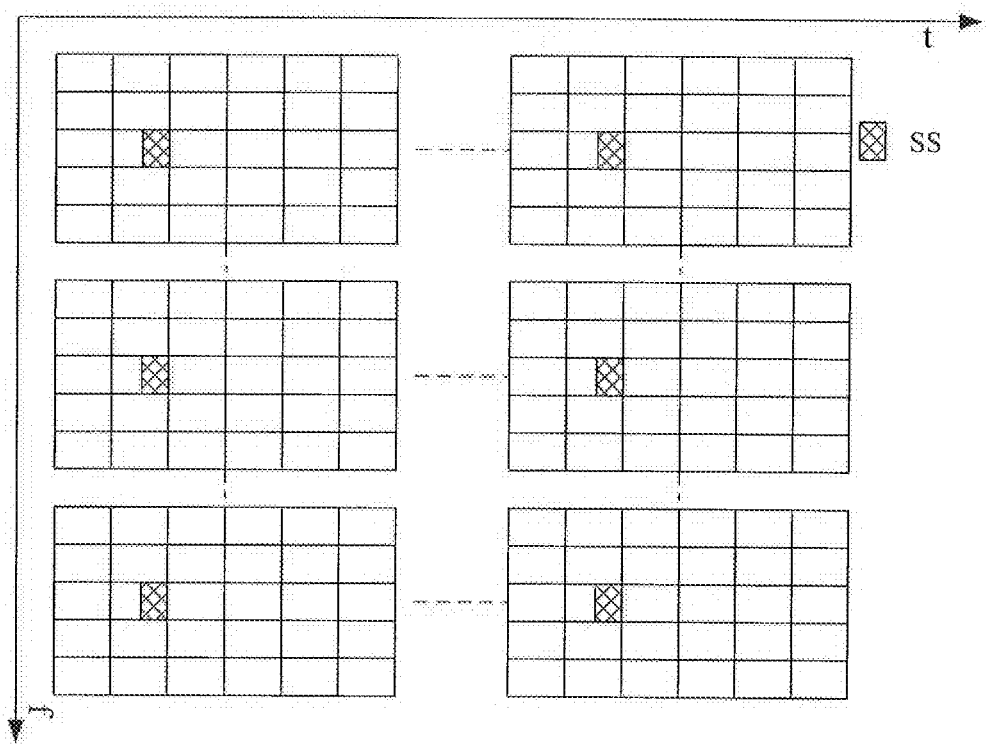
FIG. 3 is a schematic diagram of a time-frequency resource location of a downlink signal according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skilled in the art on the basis of the embodiments in the disclosure without creative work shall fall within the scope of protection of the disclosure.

It is to be understood that the technical solutions of the embodiments of the disclosure may be applied to various communication systems, for example, a present communication system of a Global System of Mobile Communication (GSM), a Code Division Multiple Access (CDMA) system, a Wideband Code Division Multiple Access (WCDMA) system, a General Packet Radio Service (GPRS), an LTE system, a Universal Mobile Telecommunication System (UMTS) or the like, and are particularly applied to a future 5G system.

In the embodiments of the disclosure, terminal equipment may refer to User Equipment (UE), an access terminal, a user unit, a user station, a mobile station, a mobile radio station, a remote station, a remote terminal, mobile equipment, a user terminal, a terminal, wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment, other processing equipment connected to a wireless modem, vehicle-mounted equipment, wearable equipment, terminal equipment in a future 5G network, terminal equipment in a future evolved Public Land Mobile Network (PLMN) or the like.

In the embodiments of the disclosure, network equipment may be equipment configured to communicate with the terminal equipment. The network equipment may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (GRAN) scenario, or the network equipment may be a relay station, an access point, vehicle-mounted equipment, wearable equipment, network equipment in the future 5G network, network equipment in the future evolved PLMN or the like.

In the embodiments of the disclosure, a carrier may also be represented as a cell and represents a communication system. In other words, in the embodiments of the disclosure, a carrier corresponds to a cell and a communication system.

FIG. 1 is a schematic diagram of an application scenario according to an embodiment of the disclosure. A communication system in FIG. 1 may include network equipment, for example, an eNodeB 20, and at least one terminal equipment, for example, UE 10, UE 11, UE 12, UE 13, UE 14, UE 15, UE 16 and UE 17. The eNodeB 20 is configured to provide communication service for the at least one terminal equipment in the UE 10 to the UE 17 for access to a core network. Each terminal equipment in the UE 10 to the UE 17 searches for an SS, broadcast signal or the like transmitted by the eNodeB 20, thereby accessing the network and further communicating with the network. For a large-bandwidth carrier system, an undiversified synchronization channel and broadcast channel manner is unlikely to meet a rapid search requirement of terminal equipment, thereby bringing influence to communication efficiency of the terminal equipment. According to the embodiment of the disclosure, multiple groups of synchronization channels, broadcast channels or the like are set in a carrier/cell to meet the rapid search requirement of the terminal equipment, thereby improving the communication efficiency of the terminal equipment.

FIG. 2 is a schematic flowchart of a method for transmitting a signal 200 according to an embodiment of the disclosure. The method 200 is executed by network equipment, for example, an eNodeB 20 in FIG. 1. The network equipment may communicate with terminal equipment in a carrier/cell. For simplicity, descriptions will be made with the carrier as an example, that is, the method in FIG. 2 is for the carrier. There are many frequency points in a bandwidth of the carrier. As shown in FIG. 2, the method 200 includes the following operations.

In S210, a time-frequency resource location of a downlink signal is determined. The downlink signal includes at least one of an SS, a broadcast signal, a common control channel signal, a common reference signal or an MRS. The time-frequency resource location of the downlink signal is on multiple frequency points of a carrier within a predetermined time and the multiple frequency points are part of frequency points within a bandwidth of the carrier.

In S220, the downlink signal is transmitted according to the time-frequency resource location of the downlink signal.

In the embodiment of the disclosure, the time-frequency resource location of the downlink signal, for example, the SS, the broadcast signal, the common control channel signal, the common reference signal or the MRS, is on the multiple frequency points of the carrier within the predetermined time, and the multiple frequency points are part of frequency points within the bandwidth of the carrier. That is, the downlink signal is neither transmitted on a single frequency point of the carrier nor transmitted on all of the frequency points of the carrier. Therefore, a rapid search requirement of terminal equipment may be met, a system overhead may be reduced, and communication efficiency of the terminal equipment may further be improved.

In such a manner, according to the method for transmitting a signal in the embodiment of the disclosure, the downlink signal is transmitted on the multiple frequency points of the carrier within the predetermined time, so that the rapid search requirement of the terminal equipment may be met, and the communication efficiency of the terminal equipment may further be improved.

It is to be understood that, in the embodiment of the disclosure, the predetermined time represents a period of time, which is not limited in the disclosure. For example, the predetermined time may be one or more radio frames and may also be one or more subframes or symbols. Transmission on the multiple frequency points of the carrier within the predetermined time may not only refer to repeated transmission on the multiple frequency points within a period of time according to periodicity but also refer to transmission on a frequency point in periodicity within a period of time and transmission on another frequency point in next periodicity.

It is also to be understood that, in the embodiment of the disclosure, patterns of time frequency resource locations of various downlink signals may be preset. The network equipment and the terminal equipment may determine the time-frequency resource locations of the downlink signals according to the preset patterns. The patterns of the time-frequency resource locations of various downlink signals may also be determined and transmitted to the terminal equipment by the network equipment. There are no limits made in the disclosure.

The embodiment of the disclosure will be specifically described below for various downlink signals.

In an example, in an embodiment of the disclosure, the downlink signal includes the SS. Under this condition, the network equipment may transmit the SS on the multiple frequency points according to periodicity.

Specifically, for enabling the terminal equipment to rapidly find the SS, in the embodiment of the disclosure, the network equipment transmits the SS on the multiple frequency points of the carrier according to the periodicity, namely repeatedly transmitting the SS on the multiple frequency points. That is, in the embodiment of the disclosure, multiple sets of SSs, usually particular digital sequences, are set and repeatedly transmitted on the multiple frequency points respectively. For example, time-frequency resource locations of the SSs may be shown in FIG. 3.

For example, if a frequency bandwidth of a 5G carrier/cell is 80 MHz, a set of SSs cyclically repeated over time may be set on each 20 MHz frequency-domain resource, and a terminal may be synchronized with the cell if finding any set of SSs.

In an example, periodicities for transmitting the SS on different frequency points in the multiple frequency points are the same as each other or different from each other.

In an example, sequences used by transmitting the SS on different frequency points in the multiple frequency points are the same as each other or different from each other.

Specifically, digital sequences for the SSs on different frequency-domain resources of the same 5G carrier/cell may be different. If different digital sequences are used, the digital sequences for the SSs on different frequency-domain resources of the same 5G carrier/cell may form a certain internal relationship. For example, different cyclic shifts of the same root sequence may be used, and the cyclic shifts may be represented by use of a specific offset to belong to the same carrier/cell.

In an example, in an embodiment of the disclosure, the downlink signal includes the broadcast signal. Under this condition, the network equipment may transmit the broadcast signal on the multiple frequency points according to the periodicity.

Specifically, for enabling the terminal equipment to rapidly find the broadcast signal, in the embodiment of the disclosure, the network equipment transmits the broadcast signal on the multiple frequency points of the carrier according to the periodicity, namely repeatedly transmitting the broadcast signal on the multiple frequency points. For example, a time-frequency resource location of the broadcast signal may be shown in FIG. 4.

For example, multiple sets of basic system information, or called Master Information Blocks (MIBs), cyclically repeated over time are set on different frequency resources in the 5G carrier/cell, and are carried by Physical Broadcast Channels (PBCHs). A downlink/uplink bandwidth, a System Frame Number (SFN), an antenna number, a control signal transmission mode or the like may be included so as to facilitate rapid reception and demodulation of the terminal equipment.

Figure 4:
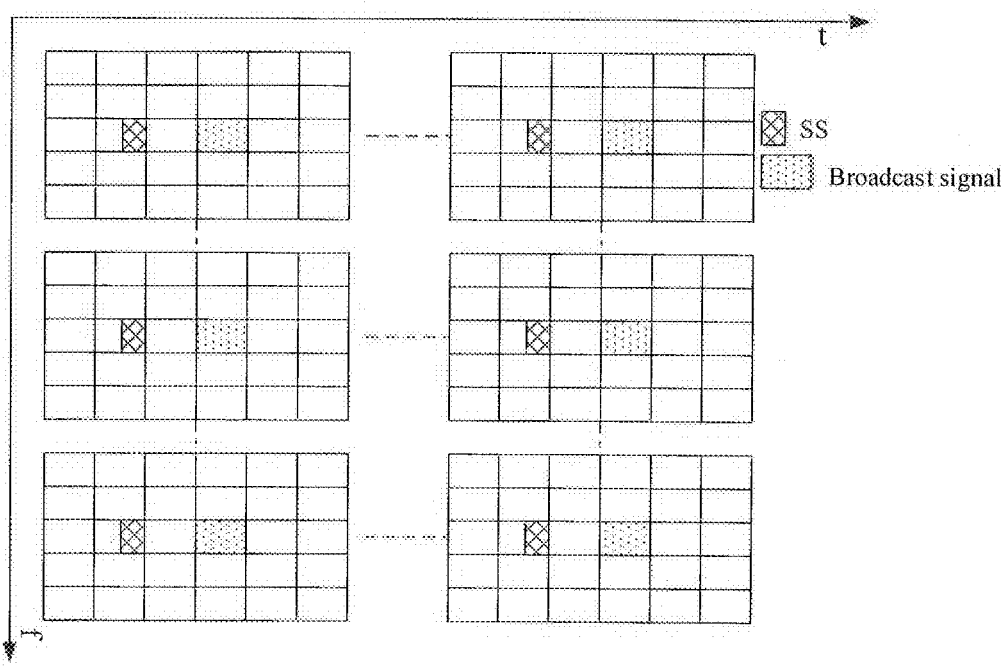
FIG. 4 is a schematic diagram of a time-frequency resource location of a downlink signal according to another embodiment of the disclosure.

In an example, the PBCHs may form a correspondence with the SSs. For example, there may be a PBCH in each of frequency-domain resources (frequency points) on which the SSs are set, for example, as shown in FIG. 4.

In an example, in an embodiment of the disclosure, the downlink signal includes the common control channel signal or the common reference signal. A time-frequency resource location of the common control channel signal or the common reference signal is within a downlink control region. The downlink control region is located on the multiple frequency points in a radio frame. A time-domain length of the downlink control region in the radio frame is smaller than a length of the radio frame.

Figure 5:
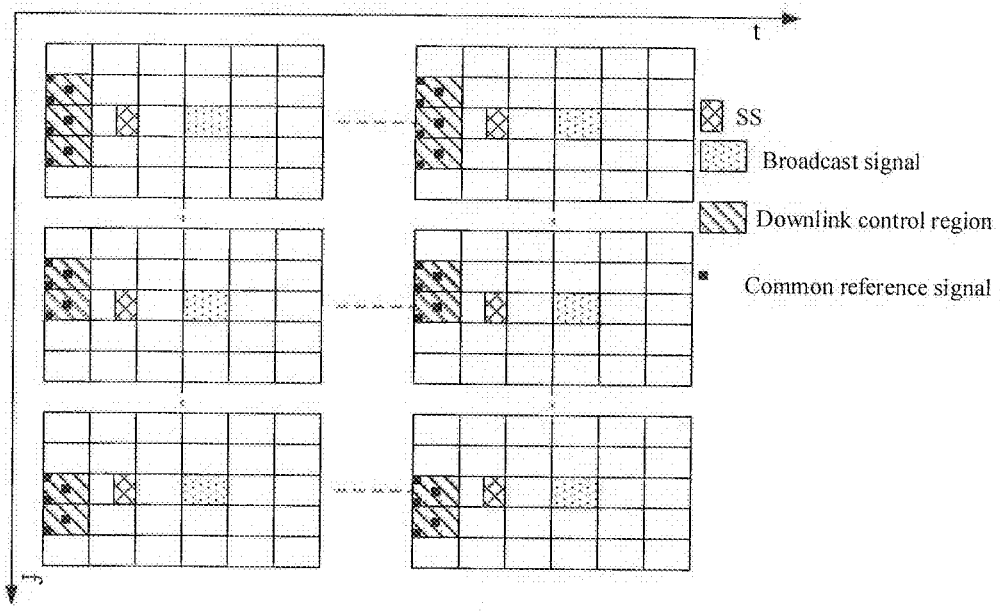
FIG. 5 is a schematic diagram of a time-frequency resource location of a downlink signal according to yet another embodiment of the disclosure.

Specifically, in the embodiment of the disclosure, the downlink control region occupies limited frequency and time resources. That is, the downlink control region, is smaller than the overall downlink bandwidth of the carrier in terms of frequency and smaller than the length of the radio frame in terms of time. The shortest downlink control region may be a symbol. For example, a location of the downlink control region may be shown in FIG. 5.

The downlink control region may also be called a downlink common control region and is configured to transmit a common control channel and/or the common reference signal. The common control channel may indicate a location of a dedicated control channel, and the dedicated control channel is configured to demodulate a certain block of user data. A common reference symbol may be configured for cell measurement reselection in an IDLE state and cell measurement handover in a CONNECTED state.

With adoption of the technical solution in the embodiment of the disclosure, a speed and accuracy of measurement of the terminal equipment in the IDLE or CONNECTED state may be improved.

In an example, the method may further include that information of the downlink control region is explicitly or implicitly indicated to terminal equipment.

That is, the information of the downlink control region may be explicitly or implicitly indicated.

Specifically, the network equipment may explicitly or implicitly indicate the information of the downlink control region to the terminal equipment through at least one of: starting and ending location information of each of the multiple frequency points; information of the radio frame and a subframe in the radio frame where the downlink control region is located; information of a sequence for the SS, the information of the sequence for the SS being configured to indicate whether the downlink control region is located on the frequency points where the SS is transmitted or not; relative time-frequency location information between the SS and the broadcast signal, the relative time-frequency location information being configured to indicate whether the downlink control region is located on the frequency points where the SS and the broadcast signal are transmitted or not; a content of the broadcast signal; or a content of basic system information indicated by the broadcast signal.

For example, it is determined whether a common control channel exists on a certain frequency resource in the 5G carrier/cell or not. If the common control channel exists on a certain frequency resource in the 5G carrier/cell, its location and an occupied resource size may be indicated in one or different ones of the following manners (not always all of the manners): starting and ending locations of different frequency resources in the 5G carrier/cell; time allocation for radio frames and radio subframes on different frequency resources in the 5G carrier/cell; sequences (for example, sequence lengths, a serial number of a root sequence in all sequences and an offset of cyclic shifts) for the SSs (in the corresponding frequency resource); relative time-frequency locations between the SSs and the PBCHs; contents of the PBCHs, including masks superimposed on the contents of the PBCHs and/or check bits; and contents of second-level or lower-level system information indicated by first-level system information (carried by the PBCHs).

In an example, in an embodiment of the disclosure, the downlink signal includes the MRS. Under this condition, the network equipment may transmit the MRS in a location, not used for downlink control region, of the multiple frequency points, according to the periodicity.

Figure 6:
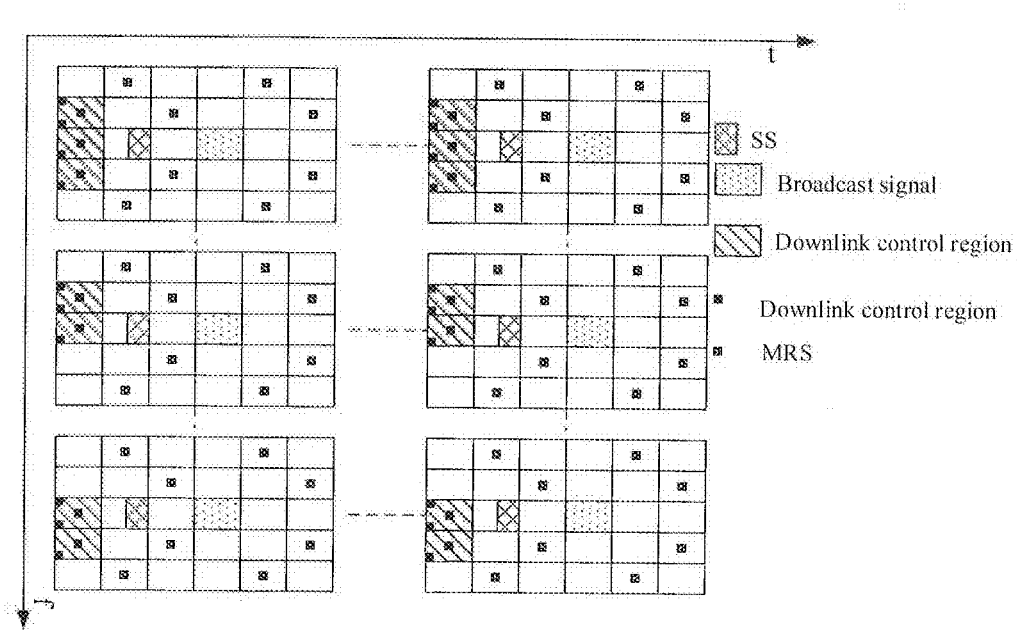
FIG. 6 is a schematic diagram of a time-frequency resource location of a downlink signal according to yet another embodiment of the disclosure.

For example, a reference signal configured for cell measurement reselection in the IDLE state and cell measurement handover in the CONNECTED state may be cyclically transmitted on different frequencies in a location, not used for downlink control region, of the 5G carrier/cell. A density of the reference signal is usually lower than a reference signal for demodulation, and it may be called an MRS. For example, a time-frequency resource location of the MRS may be shown in FIG. 6. Therefore, the speed and accuracy of measurement of the terminal equipment in the IDLE or CONNECTED state may further be improved.

In an example, if a time-frequency resource location of the MRS conflicts with a time-frequency resource location of downlink data, the MRS or the downlink data is transmitted in a punched manner, for example, as shown in FIG. 7.

It is to be understood that the time-frequency resource locations of multiple downlink signals are shown in FIG. 4 to FIG. 7. However, a relationship between the time-frequency resource locations of different downlink signals is not limited in the disclosure. In other words, the time-frequency resource locations of different downlink signals may be associated and may also be unassociated.

It is also to be understood that the specific examples in the embodiment of the disclosure are adopted not to limit the scope of the embodiment of the disclosure but only to help those skilled in the art to better understand the embodiment of the disclosure.

According to the method for transmitting a signal in the embodiment of the disclosure, the speed and accuracy of cell search and measurement in the IDLE or CONNECTED state by the terminal equipment may be improved, so that the communication efficiency of the terminal equipment may be improved.

The method for transmitting a signal in the embodiments of the disclosure is described above from a network equipment side, and the method for transmitting a signal in the embodiments of the disclosure will be described below from a terminal equipment side.

FIG. 8 is a schematic flowchart of a method for transmitting a signal 800 according to an embodiment of the disclosure. The method 800 is executed by terminal equipment, for example, any one of UE 10 to UE 17 in FIG. 1. As shown in FIG. 8, the method 800 includes the following operations.

In S810, a time-frequency resource location of a downlink signal is determined. The downlink signal includes at least one of an SS, a broadcast signal, a common control channel signal, a common reference signal or an MRS. The time-frequency resource location of the downlink signal is on multiple frequency points of a carrier within a predetermined time and the multiple frequency points are part of frequency points within a bandwidth of the carrier.

In S820, the downlink signal transmitted by network equipment is received according to the time-frequency resource location of the downlink signal.

According to the method for transmitting a signal in the embodiment of the disclosure, the downlink signal is received on the multiple frequency points of the carrier within the predetermined time, so that a rapid search requirement of terminal equipment may be met, and communication efficiency of the terminal equipment may be improved.

In an example, in an embodiment of the disclosure, the downlink signal includes the SS. The operation that the downlink signal transmitted by the network equipment is received according to the time-frequency resource location of the downlink signal includes that the SS transmitted by the network equipment according to periodicity is received on the multiple frequency points.

In an example, periodicities for transmitting the SS on different frequency points in the multiple frequency points are the same as each other or different from each other.

In an example, periodicities for transmitting the SS on different frequency points in the multiple frequency points are the same as each other or different from each other.

In an example, in an embodiment of the disclosure, the downlink signal includes the broadcast signal. The operation that the downlink signal transmitted by the network equipment is received according to the time-frequency resource location of the downlink signal includes that the broadcast signal transmitted by the network equipment according to the periodicity is received on the multiple frequency points.

In an example, in an embodiment of the disclosure, the downlink signal includes the common control channel signal or the common reference signal. A time-frequency resource location of the common control channel signal or the common reference signal is within a downlink control region. The downlink control region is located on the multiple frequency points in a radio frame, and a time-domain length of the downlink control region in the radio frame is smaller than a length of the radio frame.

In an example, the method 800 may further include that information, explicitly or implicitly indicated by the network equipment, of the downlink control region is acquired. The operation that the time-frequency resource location of the downlink signal is determined may include that the downlink control region is determined according to the information of the downlink control region.

In an example, the operation that the downlink control region is determined according to the information of the downlink control region includes that the downlink control region is determined according to at least one of: starting and ending location information of each of the multiple frequency points; information of the radio frame and a sub-frame in the radio frame where the downlink control region is located; information of a sequence for the SS, the information of the sequence for the SS being configured to indicate whether the downlink control region is located on the frequency points where the SS is transmitted or not; relative time-frequency location information between the SS and the broadcast signal, the relative time-frequency location information being configured to indicate whether the downlink control region is located on the frequency points where the SS and the broadcast signal are transmitted or not; a content of the broadcast signal; or a content of basic system information indicated by the broadcast signal.

In an example, in an embodiment of the disclosure, the downlink signal includes the MRS. The operation that the downlink signal transmitted by the network equipment is received according to the time-frequency resource location of the downlink signal includes that the MRS transmitted by the network equipment according to the periodicity is received in a location, not used for downlink control region, of the multiple frequency points.

It is to be understood that, in the embodiment of the disclosure, interaction between the network equipment and the terminal equipment and related properties, functions or the like described from the network equipment side correspond to descriptions made from the terminal equipment side and will not be elaborated herein for simplicity.

According to the method for transmitting a signal in the embodiment of the disclosure, a speed and accuracy of cell search and measurement in an IDLE or CONNECTED state by the terminal equipment may be improved, thereby improving communication efficiency of the terminal equipment.

It is to be understood that, in various embodiments of the disclosure, a sequence number of each process does not mean an execution sequence. Instead, the execution sequence of each process should be determined by its function and an internal logic and should not form any limit to an implementation process of the embodiments of the disclosure.

The method for transmitting a signal according to the embodiments of the disclosure is described above in detail. Network equipment and terminal equipment according to the embodiments of the disclosure will be described below. It is to be understood that the network equipment and terminal equipment of the embodiments of the disclosure may execute various methods in the abovementioned embodiments of the disclosure. That is, the following specific working process of each equipment may refer to the corresponding process in the method embodiments.

Figure 9:
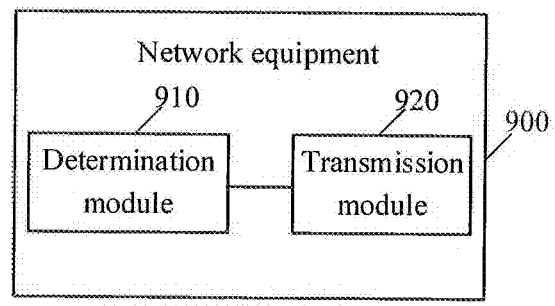
FIG. 9 is a schematic block diagram of network equipment according to an embodiment of the disclosure.

FIG. 9 is a schematic block diagram of network equipment 900 according to an embodiment of the disclosure. As shown in FIG. 9, the network equipment 900 includes a determination module 910 and a transmission module 920.

The determination module 910 is configured to determine a time-frequency resource location of a downlink signal. The downlink signal includes at least one of an SS, a broadcast signal, a common control channel signal, a common reference signal or an MRS, the time-frequency resource location of the downlink signal is on multiple frequency points of a carrier within a predetermined time and the multiple frequency points are part of frequency points within a bandwidth of the carrier.

The transmission module 920 is configured to transmit the downlink signal according to the time-frequency resource location of the downlink signal.

According to the network equipment in the embodiment of the disclosure, the downlink signal is transmitted on the multiple frequency points of the carrier within the predetermined time, so that a rapid search requirement of terminal equipment may be met, and communication efficiency of the terminal equipment may be improved.

In an example, in an embodiment of the disclosure, the downlink signal includes the SS. The transmission module 920 is specifically configured to transmit the SS on the multiple frequency points according to periodicity.

In an example, periodicities for transmitting the SS on different frequency points in the multiple frequency points are the same as each other or different from each other.

In an example, sequences for transmitting the SS on different frequency points in the multiple frequency points are the same as each other or different from each other.

In an example, in an embodiment of the disclosure, the downlink signal includes the broadcast signal. The transmission module 920 is specifically configured to transmit the broadcast signal on the multiple frequency points according to the periodicity.

In an example, in an embodiment of the disclosure, the downlink signal includes the common control channel signal or the common reference signal. A time-frequency resource location of the common control channel signal or the common reference signal is within a downlink control region. The downlink control region is located on the multiple frequency points in a radio frame, and a time-domain length of the downlink control region in the radio frame is smaller than a length of the radio frame.

In an example, in an embodiment of the disclosure, the transmission module 920 is further configured to explicitly or implicitly indicate information of the downlink control region to terminal equipment.

In an example, the transmission module 920 is specifically configured to explicitly or implicitly indicate the information of the downlink control region to the terminal equipment through at least one of: starting and ending location information of each of the multiple frequency points; information of the radio frame and a subframe in the radio frame where the downlink control region is located; information of a sequence for the SS, the information of the sequence for the SS being configured to indicate whether the downlink control region is located on the frequency points where the SS is transmitted or not; relative time-frequency location information between the SS and the broadcast signal, the relative time-frequency location information being configured to indicate whether the downlink control region is located on the frequency points where the SS and the broadcast signal are transmitted or not; a content of the broadcast signal; or a content of basic system information indicated by the broadcast signal.

In an example, in an embodiment of the disclosure, the downlink signal includes the MRS. The transmission module 920 is specifically configured to transmit the MRS in a location, not used for downlink control region, of the multiple frequency points, according to the periodicity.

In an example, the transmission module 920 is further configured to, if a time-frequency resource location of the MRS conflicts with a time-frequency resource location of downlink data, transmit the MRS or the downlink data in a punched manner.

The network equipment 900 according to the embodiment of the disclosure may correspond to network equipment in the method for transmitting a signal according to the embodiment of the disclosure and the abovementioned and other operations and/or functions of each module in the network equipment 900 are adopted to implement the corresponding flows of each method respectively and will not be elaborated herein for simplicity.

According to the network equipment of the embodiment of the disclosure, a speed and accuracy of cell search and measurement in an IDLE or CONNECTED state by the terminal equipment may be improved, so that the communication efficiency of the terminal equipment may be improved.

Figure 10:
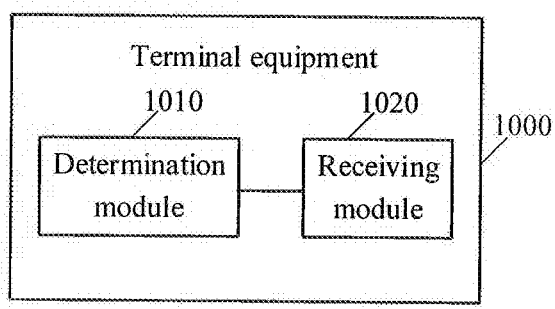
FIG. 10 is a schematic block diagram of terminal equipment according to an embodiment of the disclosure.

FIG. 10 is a schematic block diagram of terminal equipment 1000 according to an embodiment of the disclosure. As shown in FIG. 10, the terminal equipment 1000 includes a determination module 1010 and a receiving module 1020.

The determination module 1010 is configured to determine a time-frequency resource location of a downlink signal. The downlink signal includes at least one of an SS, a broadcast signal, a common control channel signal, a common reference signal or an MRS. The time-frequency resource location of the downlink signal is on multiple frequency points of a carrier within a predetermined time and the multiple frequency points are part of frequency points within a bandwidth of the carrier.

The receiving module 1020 is configured to receive the downlink signal transmitted by network equipment according to the time-frequency resource location of the downlink signal.

According to the terminal equipment of the embodiment of the disclosure, the downlink signal is transmitted on the multiple frequency points of the carrier within the predetermined time, so that a rapid search requirement of the terminal equipment may be met, and communication efficiency of the terminal equipment may be improved.

In an example, in an embodiment of the disclosure, the downlink signal includes the SS. The receiving module 1020 is specifically configured to receive the SS transmitted by the network equipment according to periodicity on the multiple frequency points.

In an example, periodicities for transmitting the SS on different frequency points in the multiple frequency points are the same as each other or different from each other.

In an example, sequences for transmitting the SS on different frequency points in the multiple frequency points are the same as each other or different from each other.

In an example, in an embodiment of the disclosure, the downlink signal includes the broadcast signal. The receiving module 1020 is specifically configured to receive the broadcast signal transmitted by the network equipment according to the periodicity on the multiple frequency points.

In an example, in an embodiment of the disclosure, the downlink signal includes the common control channel signal or the common reference signal. A time-frequency resource location of the common control channel signal or the common reference signal is within a downlink control region. The downlink control region is located on the multiple frequency points in a radio frame, and a time-domain length of the downlink control region in the radio frame is smaller than a length of the radio frame.

In an example, in an embodiment of the disclosure, the receiving module 1020 is further configured to acquire information, explicitly or implicitly indicated by the network equipment, of the downlink control region. The determination module 1010 is specifically configured to determine the downlink control region according to the information of the downlink control region.

In an example, the determination module 1010 is specifically configured to determine the downlink control region according to at least one of starting and ending location information of each of the multiple frequency points; information of the radio frame and a subframe in the radio frame where the downlink control region is located; information of a sequence for the SS, the information of the sequence for the SS being configured to indicate whether the downlink control region is located on the frequency points where the SS is transmitted or not; relative time-frequency location information between the SS and the broadcast signal, the relative time-frequency location information being configured to indicate whether the downlink control region is located on the frequency points where the SS and the broadcast signal are transmitted or not; a content of the broadcast signal; or a content of basic system information indicated by the broadcast signal.

In an example, in an embodiment of the disclosure, the downlink signal includes the MRS. The receiving module 1020 is specifically configured to receive the MRS transmitted by the network equipment according to the periodicity in a location, not used for downlink control region, of the multiple frequency points.

The terminal equipment 1000 according to the embodiment of the disclosure may correspond to terminal equipment in the method for transmitting a signal according to the embodiment of the disclosure and the abovementioned and other operations and/or functions of each module in the terminal equipment 1000 are adopted to implement the corresponding flows of each method respectively and will not be elaborated herein for simplicity.

According to the terminal equipment in the embodiment of the disclosure, a speed and accuracy of cell search and measurement in an IDLE or CONNECTED state by the terminal equipment may be improved, so that the communication efficiency of the terminal equipment may be improved.

Figure 11:
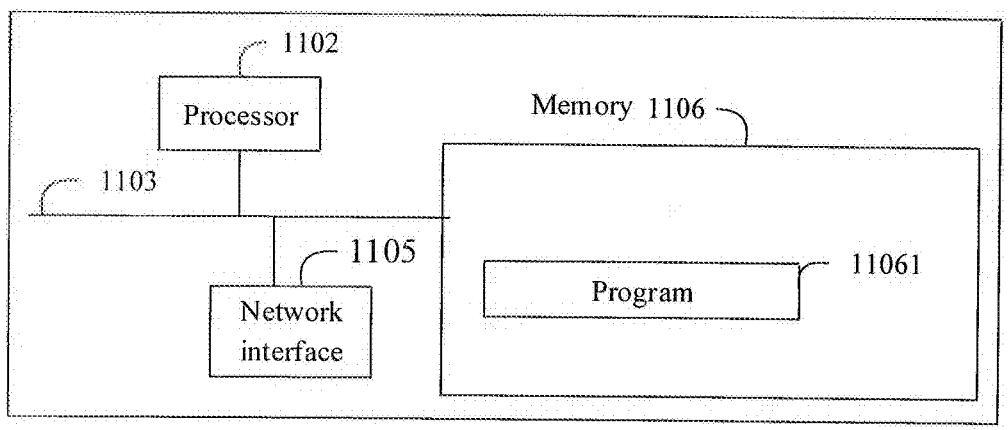
FIG. 11 is a schematic structure diagram of network equipment according to another embodiment of the disclosure.

FIG. 11 is a structure of network equipment according to another embodiment of the disclosure. The structure includes at least one processor 1102 (for example, Central Processing Unit (CPU)), at least one network interface 1105 or other communication interface, a memory 1106 and at least one communication bus 1103 configured to implement connection communication between these devices. The processor 1102 is configured to execute an executable module, for example, a computer program, stored in the memory 1106. The memory 1106 may include a high-speed Random Access Memory (RAM) and may also include a non-volatile memory, for example, at least one disk memory. A communication connection with at least one other network element is implemented through the at least one network interface 1105 (which may be wired or wireless).

In some implementation modes, the memory 1106 stores a program 11061, and the processor 1102 executes the program 11061 to execute the following operations of: determining a time-frequency resource location of a downlink signal, wherein the downlink signal includes at least one of an SS, a broadcast signal, a common control channel signal, a common reference signal or an MRS, the time-frequency resource location of the downlink signal is on multiple frequency points of a carrier within a predetermined time and the multiple frequency points are part of frequency points within a bandwidth of the carrier; and transmitting the downlink signal according to the time-frequency resource location of the downlink signal.

In an example, the downlink signal includes the SS. The processor 1102 is specifically configured to transmit the SS on the multiple frequency points according to periodicity.

In an example, periodicities for transmitting the SS on different frequency points in the multiple frequency points are the same or different.

In an example, sequences for transmitting the SS on different frequency points in the multiple frequency points are the same or different.

In an example, the downlink signal includes the broadcast signal. The processor 1102 is specifically configured to transmit the broadcast signal on the multiple frequency points according to the periodicity.

In an example, the downlink signal includes the common control channel signal or the common reference signal, a time-frequency resource location of the common control channel signal or the common reference signal is within a downlink control region, the downlink control region is located on the multiple frequency points in a radio frame, and a time-domain length of the downlink control region in the radio frame is smaller than a length of the radio frame.

In an example, the processor 1102 is further configured to explicitly or implicitly indicate information of the downlink control region to terminal equipment.

In an example, the processor 1102 is specifically configured to explicitly or implicitly indicate the information of the downlink control region to the terminal equipment through at least one of: starting and ending location information of each of the multiple frequency points; information of the radio frame and a subframe in the radio frame where the downlink control region is located; information of a sequence for the SS, the information of the sequence for the SS being configured to indicate whether the downlink control region is located on the frequency points where the SS is transmitted or not; relative time-frequency location information between the SS and the broadcast signal, the relative time-frequency location information being configured to indicate whether the downlink control region is located on the frequency points where the SS and the broadcast signal are transmitted or not; a content of the broadcast signal; or a content of basic system information indicated by the broadcast signal.

In an example, the downlink signal includes the MRS. The processor 1102 is specifically configured to transmit the MRS in a location, not used for downlink control region, of the multiple frequency points, according to the periodicity.

In an example, the processor 1102 is further configured to, if a time-frequency resource location of the MRS conflicts with a time-frequency resource location of downlink data, transmit the MRS or the downlink data in a punched manner.

As can be seen from the above technical solution provided by the embodiment of the disclosure, the downlink signal is transmitted on the multiple frequency points of the carrier within the predetermined time, so that a rapid search requirement of the terminal equipment may be met, and communication efficiency of the terminal equipment may be improved.

Figure 12:
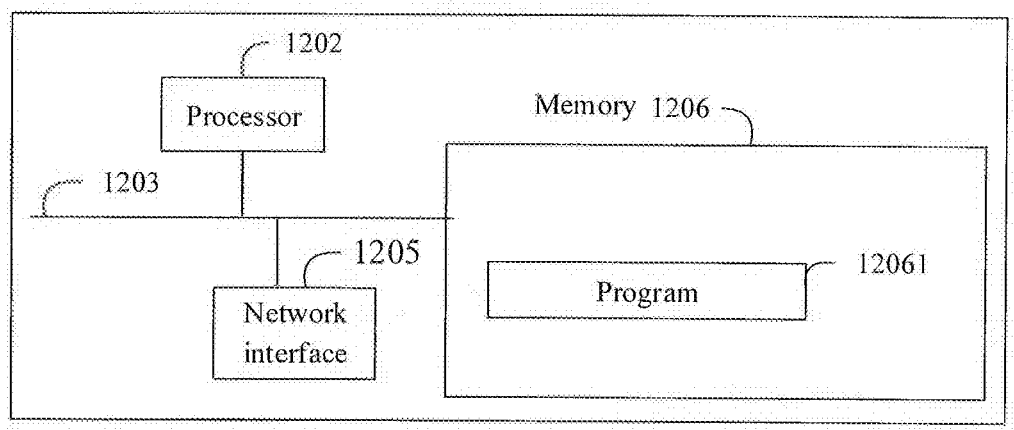
FIG. 12 is a schematic structure diagram of terminal equipment according to another embodiment of the disclosure.

FIG. 12 is a structure of a Mobility Management Entity (MME) according to another embodiment of the disclosure. The structure includes at least one processor 1202 (for example, CPU), at least one network interface 1205 or other communication interface, a memory 1206 and at least one communication bus 1203 configured to implement connection communication between these devices. The processor 1202 is configured to execute an executable module, for example, a computer program, stored in the memory 1206. The memory 1206 may include a high-speed RAM and may also include a non-volatile memory, for example, at least one disk memory. A communication connection with at least one other network element is implemented through the at least one network interface 1205 (which may be wired or wireless).

In some implementation modes, the memory 1206 stores a program 12061, and the processor 1202 executes the program 12061 to execute the following operations of determining a time-frequency resource location of a downlink signal, wherein the downlink signal includes at least one of an SS, a broadcast signal, a common control channel signal, a common reference signal or an MRS, the time-frequency resource location of the downlink signal is on multiple frequency points of a carrier within a predetermined time and the multiple frequency points are part of frequency points within a bandwidth of the carrier; and receiving the downlink signal transmitted by network equipment according to the time-frequency resource location of the downlink signal.

In an example, the downlink signal includes the SS. The processor 1202 is specifically configured to receive the SS transmitted by the network equipment according to periodicity on the multiple frequency points.

In an example, periodicities for transmitting the SS on different frequency points in the multiple frequency points are the same or different.

In an example, sequences for transmitting the SS on different frequency points in the multiple frequency points are the same or different.

In an example, the downlink signal includes the broadcast signal. The processor 1202 is specifically configured to receive the broadcast signal transmitted by the network equipment according to the periodicity on the multiple frequency points.

In an example, the downlink signal includes the common control channel signal or the common reference signal. A time-frequency resource location of the common control channel signal or the common reference signal is within a downlink control region. The downlink control region is located on the multiple frequency points in a radio frame, and a time-domain length of the downlink control region in the radio frame is smaller than a length of the radio frame.

In an example, the processor 1202 is configured to acquire information, explicitly or implicitly indicated by the network equipment, of the downlink control region and determine the downlink control region according to the information of the downlink control region.

In an example, the processor 1202 is specifically configured to determine the downlink control region according to at least one of: starting and ending location information of each of the multiple frequency points; information of the radio frame and a subframe in the radio frame where the downlink control region is located; information of a sequence for the SS, the information of the sequence for the SS being configured to indicate whether the downlink control region is located on the frequency points where the SS is transmitted or not; relative time-frequency location information between the SS and the broadcast signal, the relative time-frequency location information being configured to indicate whether the downlink control region is located on the frequency points where the SS and the broadcast signal are transmitted or not; a content of the broadcast signal; or a content of basic system information indicated by the broadcast signal.

In an example, the downlink signal includes the MRS. The processor 1202 is specifically configured to receive the MRS transmitted by the network equipment according to the periodicity in a location, not used for downlink control region, of the multiple frequency points.

As can be seen from the above technical solution provided by the embodiment of the disclosure, according to the embodiment of the disclosure, the downlink signal is received on the multiple frequency points of the carrier within the predetermined time, so that a rapid search requirement of terminal equipment may be met, and communication efficiency of the terminal equipment may be improved.

It is to be understood that, in the embodiments of the disclosure, the term "and/or" is only an association relationship describing associated objects and represents that there are three relationships. For example, A and/or B may represent three conditions, i.e., independent existence of A, coexistence of A and B and independent existence of B. In addition, the character "/" in the disclosure usually represents that previous and next associated objects form an "or" relationship.

Those of ordinary skilled in the art may realize that the units and algorithm steps of each example described in combination with the embodiments disclosed in the disclosure may be implemented by electronic hardware, computer software or a combination of the two. For clearly describing exchangeability of hardware and software, the compositions and steps of each example have been generally described in the foregoing descriptions according to functions. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the disclosure according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a Read-Only Memory (ROM), a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for data transmission, comprising:
    determining a time-frequency resource location of a downlink signal, wherein the downlink signal comprises at least one of a Synchronization Signal (SS), a broadcast signal, a common control channel signal, a common reference signal or a Measurement Reference Signal (MRS), the time-frequency resource location of the downlink signal is on multiple frequency points of a carrier within a predetermined time and the multiple frequency points are part of frequency points within a bandwidth of the carrier; and
    transmitting the downlink signal on the multiple frequency points according to the time-frequency resource location of the downlink signal, respectively,
    wherein when the downlink signal comprises the MRS, transmitting the downlink signal on the multiple frequency points according to the time-frequency resource location of the downlink signal, respectively, comprises:
transmitting the MRS in a location, not used for downlink control region, of the multiple frequency points, according to periodicity.

2. The method according to claim 1, wherein when the downlink signal comprises the SS, transmitting the downlink signal on the multiple frequency points according to the time-frequency resource location of the downlink signal, respectively, comprises:
transmitting the SS on the multiple frequency points according to periodicity.

3. The method according to claim 2, wherein periodicities for transmitting the SS on different frequency points in the multiple frequency points are the same as each other or different from each other; and
wherein sequences used by transmitting the SS on different frequency points in the multiple frequency points are the same as each other or different from each other.

4. The method according to claim 1, wherein when the downlink signal comprises the broadcast signal, transmitting the downlink signal on the multiple frequency points according to the time-frequency resource location of the downlink signal, respectively, comprises:
transmitting the broadcast signal on the multiple frequency points according to periodicity.

5. The method according to claim 1, wherein when the downlink signal comprises the common control channel signal or the common reference signal, a time-frequency resource location of the common control channel signal or the common reference signal is within a downlink control region, the downlink control region is located on the multiple frequency points in a radio frame, and a time-domain length of the downlink control region in the radio frame is smaller than a length of the radio frame.

6. The method according to claim 5, further comprising:
explicitly or implicitly indicating information of the downlink control region to terminal equipment,
wherein explicitly or implicitly indicating the information of the downlink control region to the terminal equipment comprises:
explicitly or implicitly indicating the information of the downlink control region to the terminal equipment through at least one of:
starting and ending location information of each of the multiple frequency points;
information of the radio frame and a subframe in the radio frame where the downlink control region is located;
information of a sequence for the SS, the information of the sequence for the SS being configured to indicate whether the downlink control region is located on the frequency points where the SS is transmitted or not;
relative time-frequency location information between the SS and the broadcast signal, the relative time-frequency location information being configured to indicate whether the downlink control region is located on the frequency points where the SS and the broadcast signal are transmitted or not;
a content of the broadcast signal; or
a content of basic system information indicated by the broadcast signal.

7. The method according to claim 1,
wherein the method further comprises:
if a time-frequency resource location of the MRS conflicts with a time-frequency resource location of downlink data, transmitting the MRS or the downlink data in a punched manner.

8. A method for data transmission, comprising:
determining a time-frequency resource location of a downlink signal, wherein the downlink signal comprises at least one of a Synchronization Signal (SS), a broadcast signal, a common control channel signal, a common reference signal or a Measurement Reference Signal (MRS), the time-frequency resource location of the downlink signal is on multiple frequency points of a carrier within a predetermined time and the multiple frequency points are part of frequency points within a bandwidth of the carrier; and
receiving the downlink signal transmitted by network equipment on the multiple frequency points according to the time-frequency resource location of the downlink signal, respectively,
wherein when the downlink signal comprises the MRS, receiving the downlink signal transmitted by the network equipment on the multiple frequency points according to the time-frequency resource location of the downlink signal, respectively, comprises:
receiving the MRS transmitted by the network equipment according to periodicity in a location, not used for downlink control region, of the multiple frequency points.

9. The method according to claim 8, wherein when the downlink signal comprises the SS, receiving the downlink signal transmitted by the network equipment on the multiple frequency points according to the time-frequency resource location of the downlink signal, respectively, comprises:
receiving the SS transmitted by the network equipment according to periodicity on the multiple frequency points.

10. The method according to claim 9, wherein periodicities for transmitting the SS on different frequency points in the multiple frequency points are the same as each other or different from each other, and
wherein sequences used by transmitting the SS on different frequency points in the multiple frequency points are the same as each other or different from each other.

11. The method according to claim 8, wherein when the downlink signal comprises the broadcast signal, receiving the downlink signal transmitted by the network equipment on the multiple frequency points according to the time-frequency resource location of the downlink signal, respectively, comprises:
receiving the broadcast signal transmitted by the network equipment according to periodicity on the multiple frequency points.

12. The method according to claim 8, wherein when the downlink signal comprises the common control channel signal or the common reference signal, a time-frequency resource location of the common control channel signal or the common reference signal is within a downlink control region, the downlink control region is located on the multiple frequency points in a radio frame, and a time-domain length of the downlink control region in the radio frame is smaller than a length of the radio frame.

13. The method according to claim 12, further comprising:
acquiring information, explicitly or implicitly indicated by the network equipment, of the downlink control region, wherein
determining the time-frequency resource location of the downlink signal comprises:

determining the downlink control region according to the information of the downlink control region.

14. The method according to claim 13, wherein determining the downlink control region according to the information of the downlink control region comprises:
determining the downlink control region according to at least one of:
starting and ending location information of each of the multiple frequency points;
information of the radio frame and a subframe in the radio frame where the downlink control region is located;
information of a sequence for the SS, the information of the sequence for the SS being configured to indicate whether the downlink control region is located on the frequency points where the SS is transmitted or not;
relative time-frequency location information between the SS and the broadcast signal, the relative time-frequency location information being configured to indicate whether the downlink control region is located on the frequency points where the SS and the broadcast signal are transmitted or not;
a content of the broadcast signal; or
a content of basic system information indicated by the broadcast signal.

15. Terminal equipment, comprising:
a memory configured to store at least one instruction; and
a processor configured to execute at least one instruction to
determine a time-frequency resource location of a downlink signal, wherein the downlink signal comprises at least one of a Synchronization Signal (SS), a broadcast signal, a common control channel signal, a common reference signal or a Measurement Reference Signal (MRS), the time-frequency resource location of the downlink signal is on multiple frequency points of a carrier within a predetermined time and the multiple frequency points are part of frequency points within a bandwidth of the carrier; and
receive the downlink signal transmitted by network equipment on the multiple frequency points according to the time-frequency resource location of the downlink signal, respectively,
wherein when the downlink signal comprises the MRS, the processor is further configured to execute at least one instruction to:
receive the MRS transmitted by the network equipment according to periodicity in a location, not used for downlink control region, of the multiple frequency points.

16. The terminal equipment according to claim 15, wherein when the downlink signal comprises the SS, the processor is specifically configured to receive the SS transmitted by the network equipment according to periodicity on the multiple frequency points, or
wherein the downlink signal comprises the broadcast signal; and the processor is specifically configured to receive the broadcast signal transmitted by the network equipment according to periodicity on the multiple frequency points, or
wherein the downlink signal comprises the MRS; and the processor is specifically configured to receive the MRS transmitted by the network equipment according to periodicity in a non-downlink control region of the multiple frequency points.

17. The terminal equipment according to claim 16, wherein periodicities for transmitting the SS on different frequency points in the multiple frequency points are the same as each other or different from each other, and
wherein sequences used by transmitting the SS on different frequency points in the multiple frequency points are the same as each other or different from each other.

18. The terminal equipment according to claim 15, wherein when the downlink signal comprises the common control channel signal or the common reference signal, a time-frequency resource location of the common control channel signal or the common reference signal is within a downlink control region, the downlink control region is located on the multiple frequency points in a radio frame, and a time-domain length of the downlink control region in the radio frame is smaller than a length of the radio frame.

19. The terminal equipment according to claim 18, wherein the processor is further configured to acquire information, explicitly or implicitly indicated by the network equipment, of the downlink control region; and determine the downlink control region according to the information of the downlink control region according to at least one of:
starting and ending location information of each of the multiple frequency points;
information of the radio frame and a subframe in the radio frame where the downlink control region is located;
information of a sequence for the SS, the information of the sequence for the SS being configured to indicate whether the downlink control region is located on the frequency points where the SS is transmitted or not;
relative time-frequency location information between the SS and the broadcast signal, the relative time-frequency location information being configured to indicate whether the downlink control region is located on the frequency points where the SS and the broadcast signal are transmitted or not;
a content of the broadcast signal; or
a content of basic system information indicated by the broadcast signal.

* * * * *